United States Patent [19]
Ames

[11] Patent Number: 5,233,626
[45] Date of Patent: Aug. 3, 1993

[54] REPEATER DIVERSITY SPREAD SPECTRUM COMMUNICATION SYSTEM

[75] Inventor: Stephen A. Ames, Sunnyvale, Calif.

[73] Assignee: Space Systems/Loral Inc., Palo Alto, Calif.

[21] Appl. No.: 881,134

[22] Filed: May 11, 1992

[51] Int. Cl.$^5$ .................. H04L 27/30; H04L 25/20; H04L 25/52; H04B 7/17

[52] U.S. Cl. .................. 375/1; 380/33; 380/34; 375/3; 375/4; 375/99; 375/102; 455/11.1; 455/12.1; 455/13.1; 455/65; 455/303

[58] Field of Search .................. 455/11.1, 12.1, 13.1, 455/16, 65, 276.1, 303; 375/3, 99, 101, 102, 4, 1; 370/35, 75, 97; 380/34, 33

[56] References Cited

U.S. PATENT DOCUMENTS

| | | | |
|---|---|---|---|
| 3,590,380 | 6/1971 | Zegers et al. | 375/4 |
| 3,798,544 | 3/1974 | Norman | 375/3 |
| 4,617,674 | 10/1986 | Mangulis et al. | 375/1 |
| 4,670,885 | 6/1987 | Parl et al. | 375/1 |
| 4,901,307 | 2/1990 | Gilhousen et al. | 370/18 |
| 4,905,221 | 2/1990 | Ichiyoshi | 370/18 |
| 4,914,699 | 4/1990 | Dunn et al. | 380/34 |

OTHER PUBLICATIONS

R. Price, P. E. Green, "A Communication Technique for Multipath Channels", Proceedings of the IRE, Mar., 1958, pp. 555-570.

K. Gilhousen, "Increased Capacity Using CDMA For Modile Satellite Communication", IEEE Journal on Selected Areas In Communications, vol. 8, No. 4, May 1990, pp. 503-514.

J. J. Spilker, "Digital Communications By Satellite", (Prentice Hall, Englewood Cliffs, N.J.), pp. 303-310.

*Primary Examiner*—Bernarr E. Gregory
*Attorney, Agent, or Firm*—Perman & Green

[57] ABSTRACT

A repeater diversity spread spectrum communication system provides substantially fade free communications between a transmitter (1) and a receiver (7). A transmitted signal is relayed through a plurality of linear communications repeaters (3-6) that produce copies of the transmitted signal, the copies each arriving through an independently fading signal path. The transmitter and/or the receiver may be mounted upon a mobile platform, and the plurality of repeaters may be terrestrial, or may be provided in satellites in low earth orbit or in geosynchronous earth orbit. The receiver processes the received signal copies to equalize them to one another in delay, frequency, and phase, and then combines the multiple received and equalized signal copies to produce a composite signal having a greatly reduced fading depth.

20 Claims, 6 Drawing Sheets

REPEATER DIVERSITY SPREAD SPECTRUM COMMUNICATION SYSTEM

FIELD OF THE INVENTION:

This invention relates generally to communications systems and, in particular, to communications systems that experience multi-path propagation.

BACKGROUND OF THE INVENTION:

Two problems that occur in communication systems are referred to as dropout and fade. These problems arise from a condition known as multi-path, wherein a signal proceeds to a receiver along a plurality of different transmission paths. As a result, the net received signal is a composite of a number of signals having different and randomly varying delays and amplitudes.

One approach to dealing with multi-path conditions is described in a journal article entitled "A Communication Technique For Multi-Path Channels" by R. Price and P. E. Green, Jr. (proceedings of the IRE, March 1958, pages 555-570). These authors describe a system that performs a continuous, detailed measurement of a multi-path characteristic. This knowledge is exploited to combat the effects of multi-path. Particularly, selective fading is treated by detecting the echo signals individually, using a correlation method, and adding the signals algebraically, rather than vectorially. Intersymbol interference is dealt with by reinserting different delays into the various detected echoes. This system is referred to as a "Rake" system.

In general, the purpose of the Rake system is to equalize the multi-path dispersion from a single transmitter through an ionospheric multi-path medium, thereby reducing the intersymbol interference and improving the signal-to-noise ratio (SNR).

The Rake system is applicable to a large number of small incremental delays resulting from the ionospheric multi-path, and therefore employs lengthy tapped delay lines, having a large number of taps, to compensate for the large numbers of multiple paths. Furthermore, the Rake signals have no significant Doppler spread, and the length of the tapped delay line is significantly shorter than the length of an information bit.

As a result, the Rake system is not specifically adapted for use with combinations of received signals having both a large time and frequency spread.

In a journal article entitled "Increased Capacity Using CDMA For Mobile Satellite Communication", by K. S. Gilhousen et al. (IEEE Journal on Selected Areas In Communications, vol. 8. No. 4, May 1990, pages 503-514) there is described the performance of a spread-spectrum (SS) Code Division Multiple Access (CDMA) communication system in a mobile satellite environment. These authors mention at page 506 that multiple satellites provide a further technique of improving the CDMA capacity, and that a possibility exists for an additional capacity increase by the coherent combining of signals transmitted between a terminal and all satellites in view. The use of coherent combining is said will result in a capacity gain approaching the increased number of satellites.

In U.S. Pat. No. 4,901,307, issued Feb. 13, 1990, entitled "Spread Spectrum Multiple Access Communication System Using Satellite Or Terrestrial Repeaters", K. S. Gilhousen et al. describe a communication system that provides marginal isolation between user communication signals. The marginal isolation is provided by (a) generating simultaneous multiple steerable beams, using an omnidirectional antenna with polarization enhancement, and (b) using power control devices to adjust the output power for user generated communication signals, either in response to their input activity level, or in accordance with a minimum allowable power for maintaining a communication link. In col. 32 it is stated that the repeaters for the communication links are orbital or terrestrially based repeater stations that can provide a variety of communication paths to compensate for Doppler Shifts and multi-path problems.

What is not disclosed by the foregoing, and what is thus an object of this invention to provide, is a construction for a spread spectrum radio frequency receiver so as to provide substantially fade free communications between a transmitter and the "receiver, via a plurality of linear communications repeaters.

SUMMARY OF THE INVENTION

The foregoing and other problems are overcome and the object of the invention is realized by a repeater diversity spread spectrum communication system that provides substantially fade free communications between a transmitter and a receiver, via a plurality of linear communications repeaters. The transmitter and/or the receiver may be mounted upon a mobile platform. The plurality of repeaters may be terrestrial, or may be provided in satellites in low earth orbit or in geosynchronous earth orbit. Fade resistance is achieved through the use of the multiple simultaneous repeaters to produce signals that arrive through a plurality of independently fading signal paths. The receiver of the invention processes and combines the multiple received signals to produce a summed signal having a greatly reduced fading depth. Through the use of the invention the fading depth is maintained at a low level, even when one or more of the repeater paths completely drops out due to fading or shadowing.

The transmitter and receiver antenna beams are provided so as to be sufficiently broad to cover all possible positions of the plurality of repeaters. The modulation technique may be either phase shift keying (PSK) or frequency shift keying (FSK) using a spread spectrum (SS) overlay of either a fast frequency hopping (FFH) or a direct sequence type.

More particularly, a radio frequency receiver includes circuitry for receiving a plurality of copies of a transmitted signal, each of the plurality of copies arriving at the radio frequency receiver through a different propagation path such that each copy experiences a propagation delay that differs from a propagation delay of others of the copies. The receiver also includes circuitry for performing a spread spectrum correlation on each of the received copies to produce at an output a plurality of correlated copies. The receiver also includes a received signal equalizer for equalizing each of the plurality of correlated copies one to another to provide at an output a plurality of equalized correlated copies. The equalizer includes circuitry for (a) equalizing the propagation delay of each of the correlated copies to a largest propagation delay; (b) equalizing to zero a Doppler frequency offset of each correlated copy; and (c) equalizing to zero a phase shift of each correlated copy. The receiver further includes circuitry for combining together all equalized correlated copies of the signal to provide a demodulator with a composite received signal The combining circuitry weighs each equalized correlated copy proportional to a signal strength thereof such that those copies having a greater signal strength contribute a greater proportion to the content of the composite signal than do those copies having a lesser signal strength.

In a digital signal processor embodiment of the invention an analog to digital converter is interposed between the output of the spread spectrum correlation circuitry and the input of the received signal equalizer for converting each of correlated copies from an analog signal to a digital representation thereof.

The propagation delay equalizer includes a plurality of variable length first in/first out (FIFO) buffers. Each of the FIFO buffers stores the digital representation of one of the correlated copies, and more particularly stores samples of the IF signal output by the associated correlation circuitry. The length of each FIFO buffer is selected by a controller as a function of an estimated largest propagation delay of one of the received copies, and as a function of the channel's estimated delay, so as to the delay samples with a resolution equal to a fraction of a data symbol.

The controller also has an output coupled to each of the spread spectrum correlation circuits, particularly to delay locking circuitry thereof, for specifying an estimated phase delay thereto for causing each of the delay locking circuits to acquire and track a different one of the received transmissions.

BRIEF DESCRIPTION OF THE DRAWING

The above set forth and other features of the invention are made more apparent in the ensuing Detailed Description of the Invention when read in conjunction with the attached Drawing, wherein:

FIG. 7a illustrates both frequency domain and time domain signals appearing at the nodes A, B, C, and D of FIG. 2; and FIG. 7b illustrates a sequence of arrival of the symbols depicted in FIG. 7a.

DETAILED DESCRIPTION OF THE INVENTION

Figure 1:
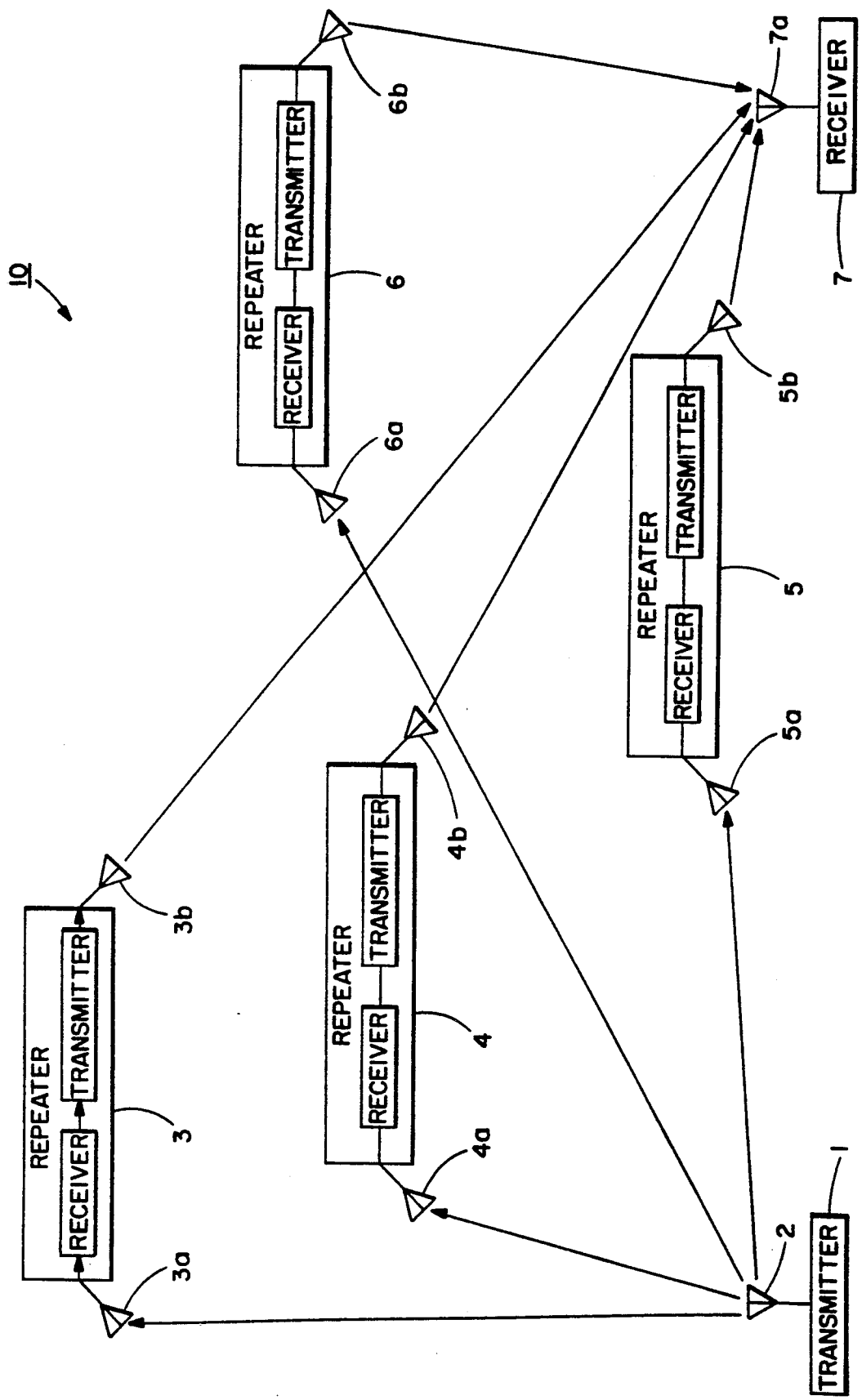
FIG. 1 is a depiction of a transmission through the repeater diversity communications system of the invention, the transmission arriving through (n) independent repeater paths.

FIG. 1 schematically illustrates an embodiment of a communication system 10 that is constructed and operated in accordance with the invention. A transmitter 1 has a transmitting antenna 2 that transmits a signal to a plurality of repeaters 3-6. Each of the repeaters is a linear repeater having a receiving antenna coupled to an input of a receiver and a transmitting antenna coupled to an output of a transmitter. For example, the repeater 3 has a receiving antenna 3a and a transmitting antenna 3b. By example only, the repeater 5 is terrestrially based, while the repeaters 3, 4, and 6 are mounted upon earth satellite platforms. Each of the repeaters 3-6 receives the transmission from the transmitter 1 and re-transmits the received signal. The plurality of repeated transmitter signals are received by a receiver 7 having a receiving antenna 7a. As can be seen in FIG. 1, the path length from each of the repeater transmitting antennas to the receiver antenna 7a is different. As a result, a multi-path condition is induced into the received signals at the receiver antenna 7a. It should be realized that although four repeaters are shown in FIG. 1, that more or less than this number can be employed.

The transmitter 1 shown in FIG. 1 may be a conventional SS type that is well known in the art. Spread spectrum communication involves processing the outgoing information signal with a spreading function that expands a narrow bandwidth signal into a broad bandwidth signal. The spreading function is a reproducible function which spreads the narrow bandwidth transmission signal over a broader bandwidth and reduces the peak spectral density of the signal. This is known as direct sequence spread spectrum coding. Alternatively, the carrier frequency may be pseudo-randomly hopped over the spread bandwidth. Direct sequence spread spectrum is preferred for applications that address multi-path impairments.

In the transmitter 1, this is accomplished by converting analog input information signals, such as voice, into a digital form and multiplying the signals by a high bandwidth, high frequency digital spreading signal. Digital, as opposed to analog, input signals can be directly spread. The resulting spread spectrum signal is then used to modulate a carrier and create a communication signal. The high bandwidth spreading signal comprises a deterministic series of bits of period $T_c$, referred to in the art as chips. The chips or chip sequences are generated using electronic apparatus and techniques known to those skilled in the art. There are a variety of techniques, as well as known coding formulas, for generating spread spectrum chip sequences.

In general, the chips are generated at a much higher frequency than the input voice or data signal. By generating the chips at a higher frequency, a series of chips are generated for every signal information bit. The specific chip frequency that is employed is a function of the allocation bandwidth for the communication system. It is desirable to spread the communication signal to cover the entire allocated bandwidth, where possible.

Figure 2:
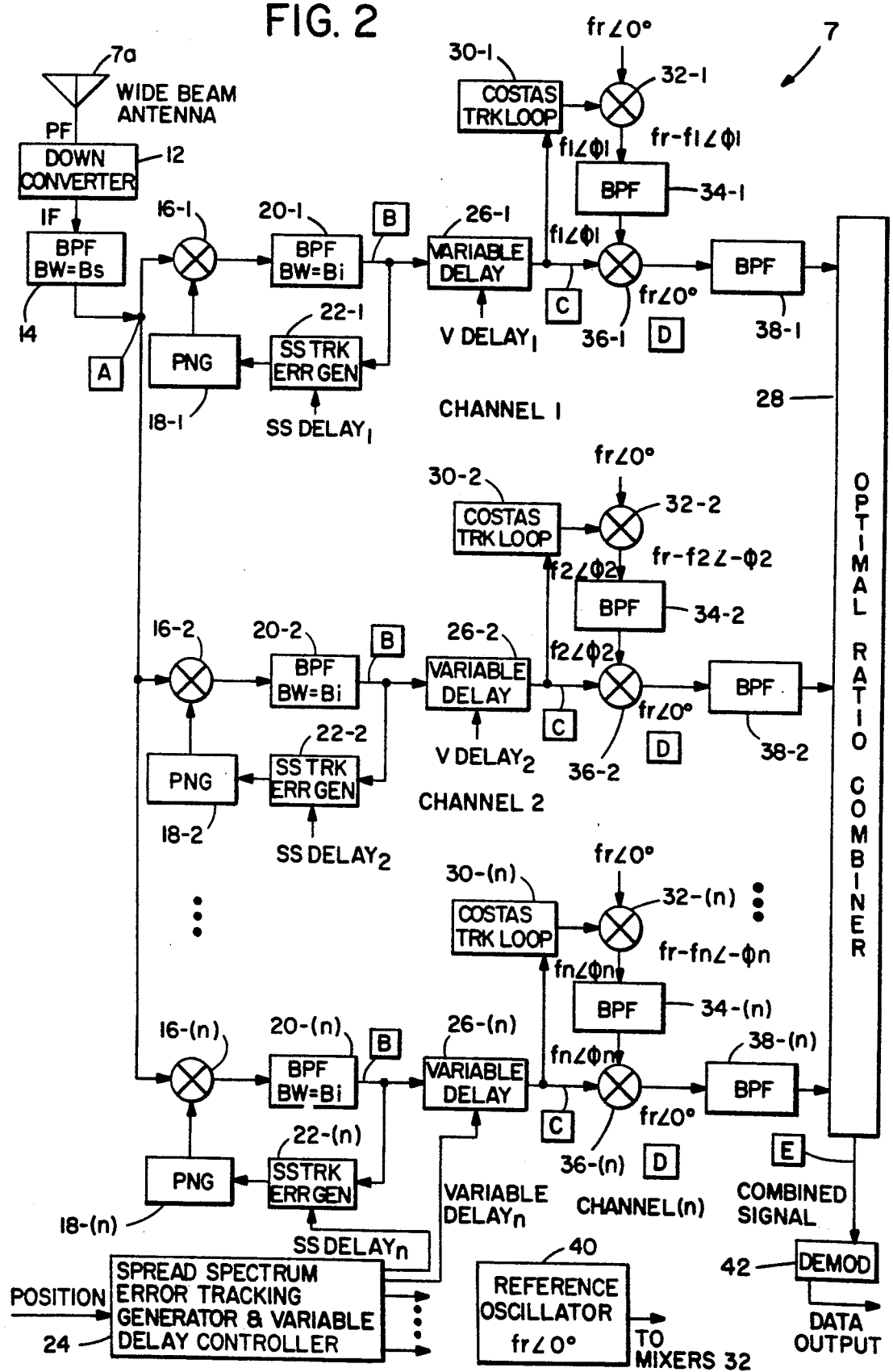
FIG. 2 is a block diagram of a first embodiment of a repeater diversity receiver for fully coherent detection.

Referring now to FIG. 2, there is shown in block diagram form the receiver 7 of FIG. 1. The receiver 7 operates to process the received repeater diversity signals and includes (n) identical processing paths, one path being provided for each repeater within the field of view of the wide beam antenna 7a.

In general, the receiver 7 includes circuitry for correlating the (n) multiple copies of the same transmitter 1 signal that arrive via the different repeaters. As will be described in detail below, the receiver 7 includes circuitry for (a) performing a spread spectrum correlation, (b) performing an equalization of all received signal delay paths to a maximum received delay, (c) performing an equalization of a Doppler frequency offset to zero, (d) performing an equalization of all phase shifts to zero, (e) combining all received copies of the signal, and (f) providing an optimal demodulation of the combined signal.

Figures 7A, 7B:
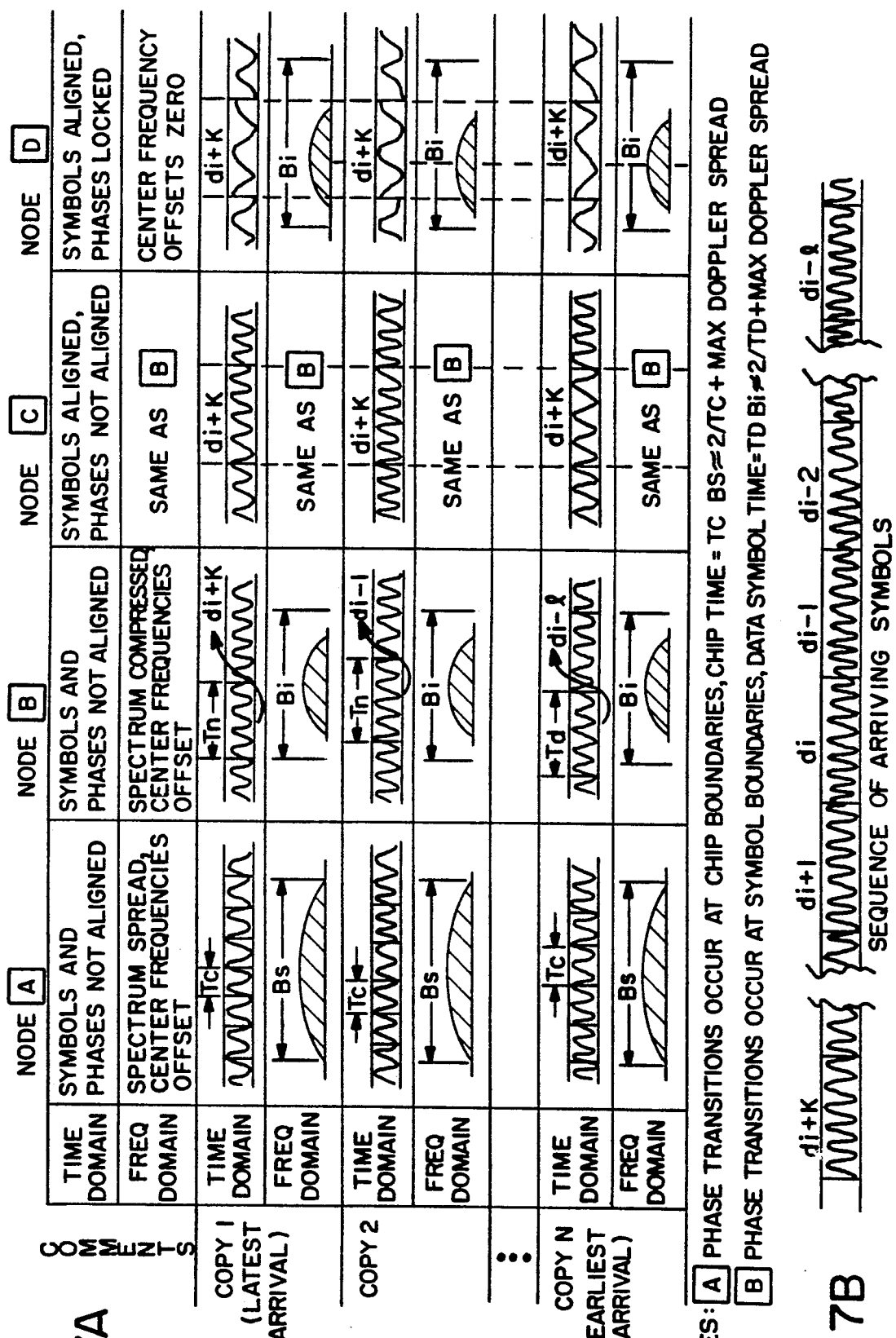

The following description of the operation of the circuitry shown in FIG. 2 is intended to be read in conjunction with the signal diagrams of FIGS. 7a and 7b. In FIG. 7a the nodes labeled A, B, C, and D correspond to the like-designated nodes in FIG. 2. It should be noted that the relative spectral bandwidth of Bs and Bi is shown for graphical convenience. In practice:

$1,000 \leq Bs/Bi \leq 100,000$, which implies
$1,000 \leq Td/Tc \leq 100,000$.

In FIG. 2 the receiver 7 includes a down converter 12 that converts the input SS signal, plus interference and noise, from radio frequency (RF) to an intermediate frequency (IF). A bandpass filter 14 filters the IF signal to a bandwidth Bs that is equal to the SS band width plus the maximum and minimum Doppler shifts. At the node labeled A the composite signals are applied to (n) mixers 16. For each of the receiver processing channels (channel 1, channel 2, channel n), there is provided an associated mixer 16-1, 16-2, ... 16-(n), respectively.

In that receiver channels 1-(n) are substantially identical to one another, the remaining discussion will be made in reference to receiver channel 1, it being realized that the discussion applies equally to all receiver channels.

The mixer 16-1 is driven by a pseudorandom noise generator (PNG) 18-1. The mixing product that is output from the mixer 16-1 is applied to an IF bandpass filter 20-1 of bandwidth Bi, where Bi is the bandwidth of the signal modulated with data, plus the maximum Doppler shifts. A spread spectrum tracking error generator 22-1 has an input coupled to an output of the bandpass filter 20-1, the output of the bandpass filter 20-1 being indicated by the node B. After the spread spectrum tracking error generator 22-1 has acquired and tracked the received signal, the signal is compressed in bandwidth, at the output of the IF bandpass filter 20-1, to the intelligence conveyed by the signal plus the Doppler bandwidth (Bi). By example, for direct sequence SS, the SS tracking error generator 22-1 is implemented by a delay-locked detector. A delay-locked detector is a known device that functions by subtracting a correlation function, in an early correlation of the received signal with a local reference pilot sequence, from a correlation function in a late correlation of the received signal with the local pilot reference sequence. If there is no time tracking error, the difference is zero. If the local reference leads the correct timing, a negative difference signal is produced and, conversely, if the local reference lags the correct timing, a positive difference signal is produced.

For a fast frequency hopping (FFH) embodiment, the SS tracking error generator 22-1 and the PNG 18-1, are replaced by a synchronized Frequency Hopping (FH) synthesizer that produces the same bandwidth compression as the direct sequence SS technique that is illustrated in FIG. 2.

For the fully coherent case shown in FIG. 2 the SS tracking error generator 22-1 receives a control signal from a spread spectrum error tracking generator and variable delay controller 24. The control signal specifies an amount of expected delay for the signal being processed by that channel and is employed as an aid in delay locking the channel to the signal received from one of the (n) repeater paths.

In accordance with an aspect of the invention, one function of the controller 24 is to cause each of the (n) SS tracking error generators 22 to acquire a distinct one of the copies of the (n) SS signals that are received from the repeaters of FIG. 1. As an example, the controller 24 operates to cause channel 1 to acquire and track the signal having the largest delay, channel 2 to acquire and track the signal having the next largest delay, and so forth. As a result, channel (n) acquires and tracks the received signal having a minimum delay. This channel acquisition technique is preferred in that, if two or more of the channels were to acquire and track the same copy of the signal, the signal fades would no longer be independent, thereby reducing the fade resistance of the resulting summed signal.

Figure 5:
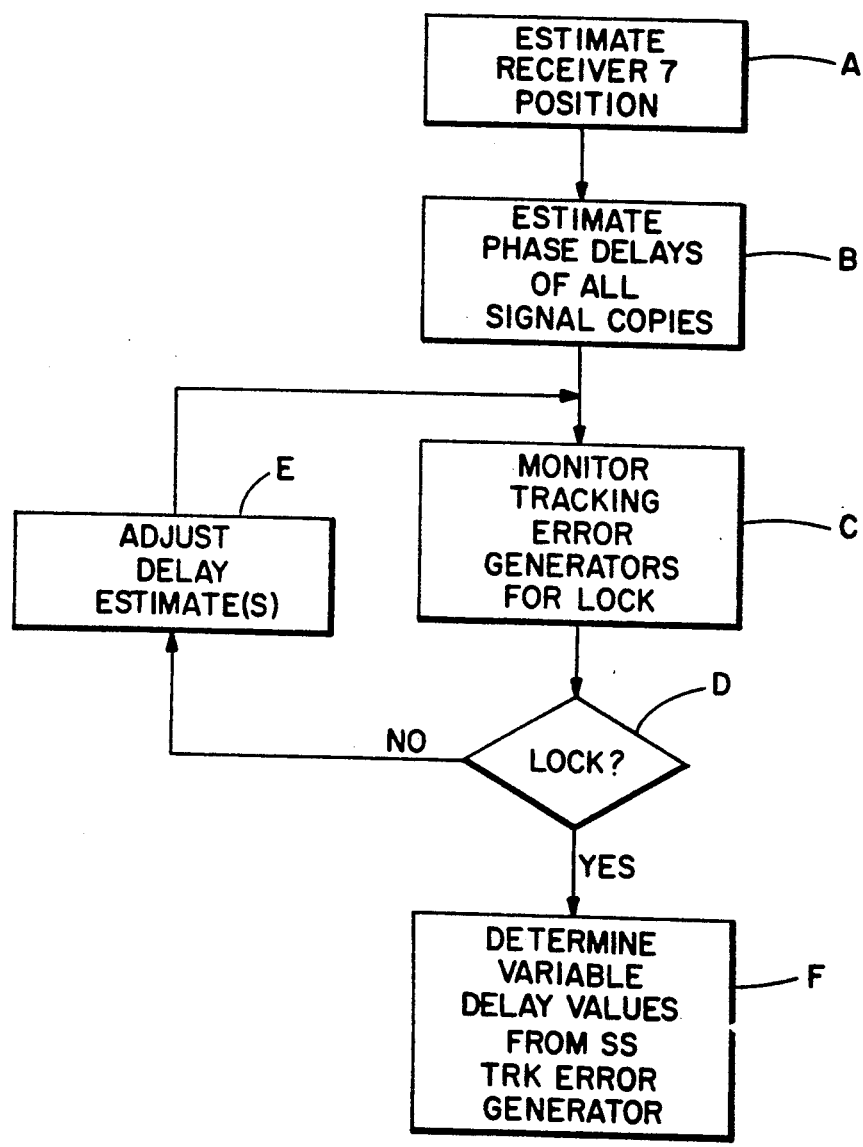
FIG. 5 is a logic flow diagram illustrating the operation of a SS error tracking generator and variable delay controller.

Another function of the controller 24 is to estimate, to an accuracy of a fraction of an SS chip time, the delay between the ith SS code copy and the maximum delayed code copy. When this is achieved, the controller 24 adjusts each variable delay 26-1 to 26-(n) such that all signals emerging at node C are equalized to the received copy that has the maximum delay. So as to achieve these functions, and in accordance with the logic flow diagram of FIG. 5, the controller 24 is provided with an estimate of the position of the receiver 7 (Block A). By example, if the receiver 7 is located on a mobile platform, the position estimate may be generated by an inertial navigation unit. The controller 24 also has prior knowledge of the positions of each of the repeaters 3-6 of FIG. 1. Based on the knowledge of the position of the receiver 7, and the positions of the repeaters 3-6, the controller 24 estimates the path length, and hence the expected phase shift of the signal, between each repeater and the receiver 7 (Block B). The expected phase delays are provided to respective ones of the SS tracking error generators 22-1 to 22-(n) so as to initially set each SS tracking error generator 22 to be at or near the expected phase delay of one of the received signals.

At Block C the controller 24 monitors each of the SS tracking error generators 22 to determine if the associated tracking loop has achieved lock. After a predetermined integration time the controller adjusts the SS Delay signal for those tracking loops that have not achieved lock (Block D). If lock is not achieved, the controller 24 increments the delay estimate upward or downward (Block E), integrates for a predetermined interval, and senses if lock has been achieved (Block C). If lock is not achieved the search for lock may continue indefinitely, according to a search plan programmed into the controller 24. No output signal is added into an optimal ratio combiner 28, as described below, unless and until lock and full equalization is achieved on that signal.

After achieving lock with each channel, the controller 24 determines at Block F, based on the SS Delay signal values, a variable delay (VDELAY) for each of the associated variable delay blocks 26-1 to 26-(n). The VDELAY signals are employed, in a presently preferred embodiment of the invention, to select a length of a FIFO buffer such that the digitized carrier-modulated signal stored within each are adjusted in time to within a fraction of a data bit at the output of the variable delay blocks 26-1 to 26-(n).

Figure 6:
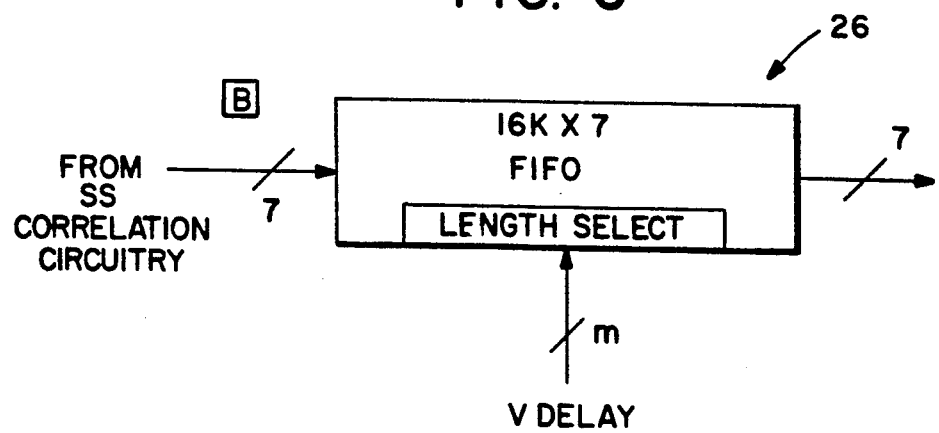
FIG. 6 is a block diagram showing a presently preferred embodiment of a variable delay device.

Thus, in a presently preferred embodiment of the invention each of the blocks labelled variable delay 26-1 to 26-(n) is implemented as a variable length, first in/-first out (FIFO) buffer, as is shown in FIG. 6.

It should be noted that for a system that employs non-coherent demodulation, the demodulation may be performed at node C, where the path delays are all equalized, and without the additional processing shown between nodes C and D in FIG. 2. If differentially coherent demodulation is performed, the Doppler shifts of the copies of the signal are required to be removed, although phase equalization is unnecessary. Thus, whereas the embodiment of FIG. 2 illustrates signal processing to perform fully coherent demodulation on MPSK underlying modulation, it should be realized that other embodiments of the invention will vary from the embodiment illustrated in FIG. 2.

In FIG. 2 the (n) copies of the signal are phase locked at the input to an optimal ratio combiner 28. This is achieved by splitting the delay equalized signals at node C into two signal paths. A first path includes a well-known Costas-type tracking loop 30-1 which extracts from the channel signal a suppressed carrier component of frequency fi and phase angle $\phi_i$. The output of the Costas tracking loop 30-1 is input to a mixer 32-1 which is also fed with a reference signal of frequency fr at a phase angle of 0°. The reference signal of frequency fr and phase angle 0° is supplied from a reference oscillator 40. The difference term output from mixer 32-1 is applied to a bandpass filter 34-1, the output of which is the difference frequency (fr - fi) at a phase angle of $-\phi_i$. This filtered signal is applied to a mixer 36-1. The mixer 36-1 is in the second of the two paths of the delayed equalized signal at node C.

By example, the operation of a Costas loop is described in "Digital Communications by Satellite", by J. J. Spilker, Jr, at pages 303-310 (Prentice-Hall, Inc., Englewood Cliffs, N.J.).

As a result of this signal processing technique, all signal copies at nodes D carry the associated channel's intelligence modulation on a carrier signal which has a carrier frequency at fr and a phase angle 0°. The signal at node D is applied to a bandpass filter 38-1 which passes only the sum frequency term fr. As a result, the signals that are input to the optimal ratio combiner 28 from each of the channels 1-(n) are all equalized to one another in delay, frequency, and phase shift. Thus, at the input to the optimal ratio combiner 28 only the amplitudes of the input signals from channels 1-(n) differ.

The optimal ratio combiner 28 operates to weigh each signal component proportional to its strength and to form a sum signal at an output. The output of the optimal ratio combiner is the node E which forms the input to a demodulator 42. In operation, the optimal ratio combiner 28 functions to cause signals of larger amplitudes, and therefore of larger SNR, to form a larger proportion of the output signal at node E than the proportion contributed by the weaker signals.

The demodulator 42 is of a type that is appropriate for whatever modulation technique underlies the SS signal. By example, if the data modulation is MPSK, then the demodulator 42 is a coherent MPSK type. If differentially coherent demodulation is employed, the demodulation is performed after the Doppler equalization at node D, in which case the optimal ratio combiner 22 is employed at baseband and the demodulator 42 can be eliminated. A similar case is presented if the data modulation is non-coherent FSK.

A significant performance enhancement is gained by the use of the system of the invention, as compared to a single repeater system. A single repeater system suffers a fade depth equal to the fade depth of the single transmission path. However, for an nth order diversity system, with equal strength repeater links as described above, the combined signal strength over the single channel system is (n). Thus, if one of the repeater links of FIG. 1 drops out completely, the fade depth of the diversity receiver system 10 is given by:

$$\textit{fade depth (dB)} = 10 \log (n - L/n). \qquad (1)$$

Figure 3:
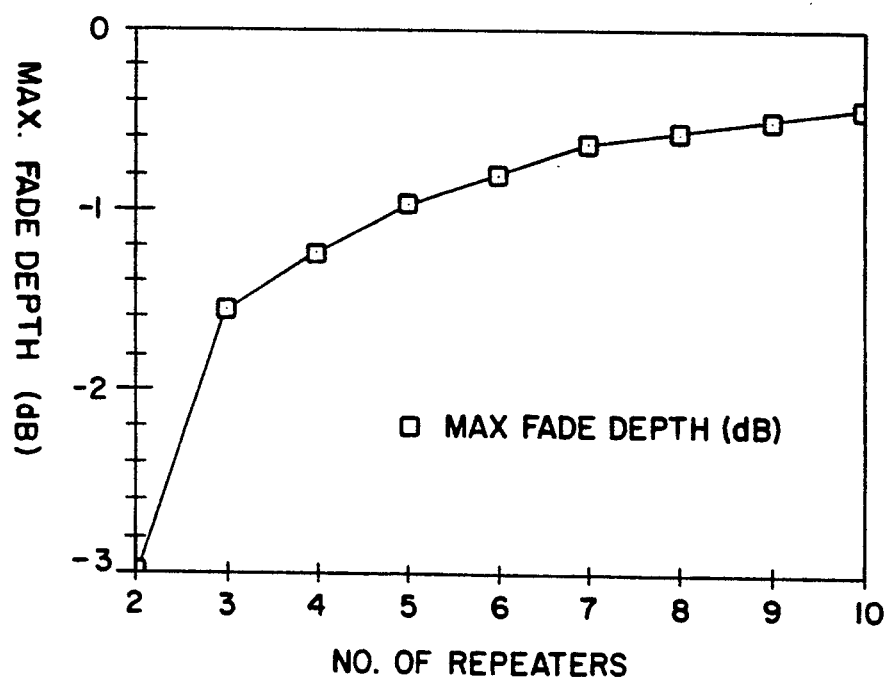
FIG. 3 is graph illustrating a maximum fade depth, in dB, due to a complete loss of one out of (n) repeaters.

Equation 1 is plotted in FIG. 3 for cases of greatest interest, that is for $L \leq 10$. As can be seen, for a two repeater system a complete fade out of one of the signals results in only a three dB system fade. However, for a single repeater system the loss of the single repeater would result in a 100% outage. For the case of five repeaters, a complete drop out of one repeater signal produces only a one dB fade in the combined signal. This amount of signal degradation is insignificant for many applications.

Figure 4:
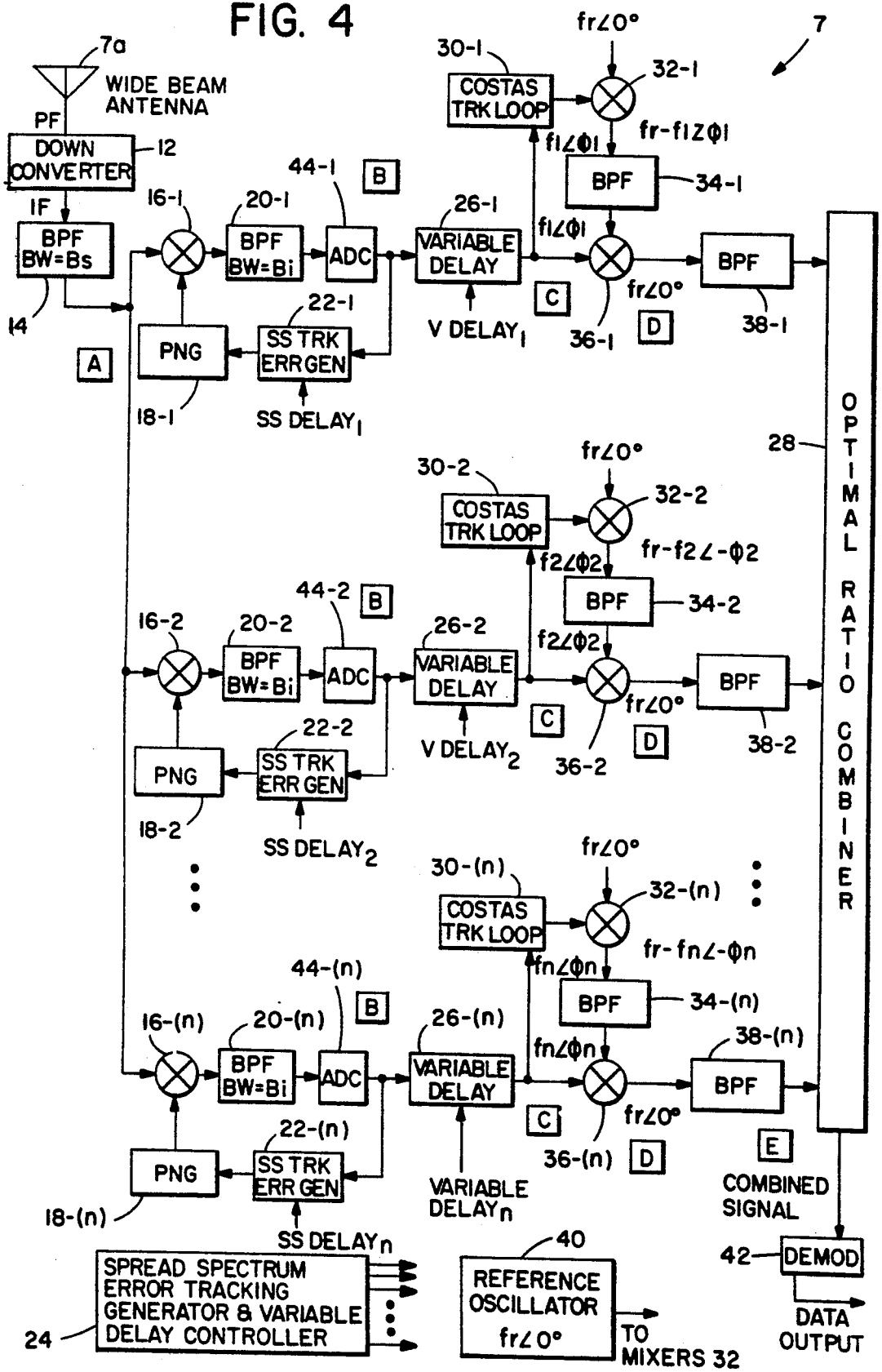
FIG. 4 is a block diagram of a second embodiment of a repeater diversity receiver for fully coherent detection, this embodiment being implemented with digital signal processors and discrete analog circuitry.

At relatively low data rates, such as 4.8 KBPS (4,800 bits per second), such as that used for coded voice in mobile satellite communications, a significant portion of the receiver 7 shown in FIG. 2 may be implemented using digital signal processors (DSPs). For the DSP embodiment of FIG. 4 the down converter 12, bandpass filter 14, mixers 16-1 to 16-(n), and the bandpass filters 20-1 to 20-(n) are preferably implemented with analog elements. The remainder of the blocks are implemented by the digital signal processors, with preferably one DSP being used to implement each one of the channels 1-(n). Also, for the DSP embodiment of FIG. 4 an analog to digital converter (ADC) 44 is provided for each channel to convert the output of the bandpass filter 20 to a digital signal. An analog to digital converter having seven bits of resolution is sufficient for IF sampling of most communication signals. The digital variable delay buffer 26-1 to 26-(n) may be implemented with a 16K × 7 bit FIFO having a write access time of less than 2.8 microseconds. So as to minimize the sampling rate, and enhance the computational load, complex signal processing is preferably employed throughout the digital circuitry.

As was previously noted, the variable delay 26-1 to 26-(n) is preferably implemented as a variable length FIFO buffer. The maximum size of the FIFO buffer can be determined from a maximum differential delay between the diversity paths and the time between samples. That is, the maximum FIFO buffer length is equal to the maximum differential delay divided by the ADC 44 sample interval.

By example, for repeaters on geostationary satellites the maximum differential path delay is approximately 36.6 milliseconds. The nominal bandwidth of the post-correlation bandpass filter is 11 kHz. A minimum Nyquist sampling rate is two times Bi. However, to produce high accuracy delay equalization between the channels, a sampling rate of 32×Bi is preferably employed. This results in the ADC 44 operating at approximately 350,000 samples per second. As a result, the maximum FIFO buffer length is equal to 36.6 milliseconds × 350 kHz or, 12,810 samples. Thus, the 16K × 7 bit FIFO is more than adequate to store the sampled signal for each channel.

While the invention has been particularly shown and described with respect to a preferred embodiment thereof, it will be understood by those skilled in the art that changes in form and details may be made therein without departing from the scope and spirit of the invention.

What is claimed is:

1. A radio frequency receiver, comprising:

means for receiving a multi-path transmitted signal comprised of a plurality of signals, each of the plurality of signals arriving at the radio frequency receiver through a separate repeater means and along a different propagation path such that each of the plurality of signals experiences a propagation delay that differs from a propagation delay of others of the plurality of signals;

means for performing a spread spectrum correlation on each of the received plurality of signals to produce at an output a plurality of correlated signals;

received signal equalizing means having an input coupled to said output of said correlation means for equalizing each of the plurality of correlated signals one to another to provide at an output a plurality of equalized correlated signals, said equalizing means including means for equalizing the propagation delay of each of the correlated signals to a largest propagation delay, means for equalizing a Doppler frequency offset of each correlated signal, and means for equalizing a phase shift of each correlated signal; said radio frequency receiver further including means, having an input coupled to said output of said received signal equalizing means, for combining together all equalized correlated signals to provide at an output a composite received signal.

2. A radio frequency receiver as set forth in claim 1 and further including means, having an input coupled said output of said combining means, for demodulating said composite received signal.

3. A radio frequency receiver as set forth in claim 1 and further including means, interposed between said output of said spread spectrum correlation means and said input of said received signal equalizing means, for converting each of said correlated signals from an analog signal to a digital representation thereof, and wherein said received signal equalizing means and said combining means operate on said digital representations.

4. A radio frequency receiver as set forth in claim 3 wherein said propagation delay equalizing means includes a plurality of first in/first out FIFO buffer means each of which stores the digital representation of one of said correlated signals, and wherein a length of each of said FIFO buffer means is selected as a function of an estimated largest propagation delay of one of said received signals.

5. A radio frequency receiver as set forth in claim 1 wherein there are a plurality of spread spectrum correlation means, and further including control means for estimating a correlation function for each of said received signals, and for providing a different estimated correlation function to each of said plurality of spread spectrum correlation means so as to cause each of said spread spectrum correlation means to acquire and track a different one of said received signals.

6. A radio frequency receiver as set forth in claim 1 wherein there are a plurality of propagation delay equalizing means each of which equalizes a propagation delay of a different one of the correlated signals, and further including control means for estimating the propagation delay for each of said received signals and for providing a different estimated propagation delay to each of said plurality of propagation delay equalizing means so as to cause each of said propagation delay equalizing means to delay its correlated copy by a different amount of time such that each of the correlated signals are output from their respective propagation delay equalizing means at approximately a time that a correlated signal having the largest propagation delay is output from its associated propagation delay equalizing means.

7. A radio frequency receiver as set forth in claim 6 and further including means, interposed between said output of said spread spectrum correlation means and said input of said received signal equalizing means, for converting each of said correlated signals from an analog signal to a digital representation thereof, and wherein each of said plurality of propagation delay equalizing means includes a first in/first out FIFO buffer means for storing the digital representation of one of said correlated signals, and wherein a length of each of said FIFO buffer means is selected by said control means as a function of an estimated largest propagation delay of one of said received signals.

8. A radio frequency receiver, comprising:

means for receiving n transmissions from a single transmitter, each of the n transmissions following a different propagation path, and each of the propagation paths having a different propagation path length;

n receiver channels each of which is responsive to one of the n received transmissions for acquiring and tracking an associated one of the n received transmissions;

combining means having inputs coupled to an output of each of said n receiver channels and including means for combining the output of said n receiver channels into a combined signal that is representative of the signal transmitted from the transmitter; wherein each of said n receiver channels includes, spread spectrum correlation means that includes means for phase locking to one of said n received transmission for recovering data symbols therefrom; and means, having an input coupled to an output of said phase locking means and an output coupled to one of said inputs of said combining means, for delaying the recovered data symbols with a resolution equal to a fraction of a data symbol; and wherein said receiver further comprises, control means having an output coupled to each of said plurality of phase locking means for specifying a phase delay thereto for causing each of said phase locking means to acquire and track a different one of said n received transmission, said control means further having an output coupled to each of said delay means for providing to each of said delay means a signal that specifies a data symbol delay period for use by each, such that the outputs of said n receiver channels that are input to said combining means are substantially equalized to one another in frequency, delay, and phase shift.

9. A receiver as set forth in claim 8 wherein said combining means includes means for weighting each input proportional to a signal strength of the signal such that those input signals having a greater signal strength contribute a greater proportion to the content of the combined signal than do those input signals having a lesser signal strength.

10. A receiver as set forth in claim 8 wherein each of said delay means includes a variable length, first in/first out buffer means, and wherein the length of each of said first in/first out buffer means is specified by said output of said control means.

11. A receiver as set forth in claim 8 wherein each of said n transmissions from a single transmitter is relayed to said receiving means from a different repeater means.

12. A receiver as set forth in claim 11 wherein at least one of said repeater means is mounted on an earth satellite.

13. A communication system, comprising:
a spread spectrum transmitter means;
a spread spectrum receiver means; and
a plurality of repeater means each of which includes means for receiving a transmission from said spread spectrum transmitter means and means for re-transmitting said received transmission for reception by said spread spectrum receiver means; wherein said spread spectrum receiver means includes,
means for receiving a re-transmitted signal from each of said repeater means;
means for performing a spread spectrum correlation on each of the received re-transmitted signals to produce at an output a plurality of correlated signals;
received signal equalizing means having an input coupled to said output of said correlation means for equalizing each of the plurality of correlated signals one to another to provide at an output a plurality of equalized correlated signals, said equalizing means including means for equalizing a propagation delay of each of the correlated signals to a largest propagation delay, means for equalizing a Doppler frequency offset of each correlated signal, and means for equalizing a phase shift of each correlated signal; said spread spectrum receiver means further including
means, having an input coupled to said output of said received signal equalizing means, for combining together all equalized correlated signals to provide at an output a composite received signal.

14. A communication system as set forth in claim 13 wherein said spread spectrum receiver means further includes means, having an input coupled said output of said combining means, for demodulating said composite received signal.

15. A communication system as set forth in claim 13 wherein said spread spectrum receiver means further includes means, interposed between said output of said spread spectrum correlation means and said input of said received signal equalizing means, for converting each of said correlated signals from an analog signal to a digital representation thereof, and wherein said received signal equalizing means and said combining means operate on said digital representations.

16. A communication system as set forth in claim 15 wherein said propagation delay equalizing means includes a plurality of first in/first out FIFO buffer means each of which stores the digital representation of one of said correlated signals, and wherein a length of each of said FIFO buffer means is selected as a function of an estimated largest propagation delay of one of said received signals.

17. A communication system as set forth in claim 13 wherein said spread spectrum receiver means is comprised of a plurality of said spread spectrum correlation means, and wherein said spread spectrum receiver means further includes control means for estimating a correlation function for each of said received re-transmitted signals, and for providing a different estimated correlation function to each of said plurality of spread spectrum correlation means so as to cause each of said spread spectrum correlation means to acquire and track a different one of said received re-transmitted signals.

18. A communication system as set forth in claim 13 wherein said spread spectrum receiver means is comprised of a plurality of said propagation delay equalizing means each of which equalizes a propagation delay of a different one of the correlated signals, and wherein said spread spectrum receiver means further includes control means for estimating the propagation delay for each of said received re-transmitted signals and for providing an estimated propagation delay to each of said plurality of propagation delay equalizing means so as to cause each of said propagation delay equalizing means to delay its correlated copy by a specified amount of time, and hereby causing each of the correlated signals to be output from its respective propagation delay equalizing means as approximately a same time that a correlated signal having the largest propagation delay is output from its associated propagation delay equalizing means.

19. A communication system as set forth in claim 18 wherein said spread spectrum receiver means further includes means, interposed between said output of said spread spectrum correlation means and said input of said received signal equalizing means, for converting each of said correlated signals from an analog signal to a digital representation thereof, and wherein each of said plurality of propagation delay equalizing means includes a first in/first out FIFO buffer means for storing the digital representation of one of said correlated signals, and wherein a length of each of said FIFO buffer means is selected by said control means as a function of an estimated largest propagation delay of one of said received re-transmitted signals.

20. A communication system as set forth in claim 13 wherein each of said repeater means is a linear repeater means, and wherein at least one of said repeater means is mounted on an earth satellite.

* * * * *